United States Patent [19]
Fath

[11] 3,898,202
[45] Aug. 5, 1975

[54] EPIHALOHYDRIN CURE REGULATORS

[75] Inventor: Michael A. Fath, Cuyahoga Falls, Ohio

[73] Assignee: The Goodyear Tire & Rubber Company, Akron, Ohio

[22] Filed: Nov. 5, 1973

[21] Appl. No.: 413,127

[52] U.S. Cl. .................................. 260/79; 260/2 A
[51] Int. Cl.² ...................... C08G 65/32; C08J 3/24
[58] Field of Search .............. 260/2 A, 79 R, 79.5 R

[56] References Cited
UNITED STATES PATENTS

| | | | |
|---|---|---|---|
| 3,007,902 | 11/1961 | Nelson | 260/79 |
| 3,057,832 | 10/1962 | Brock | 260/79 |
| 3,177,182 | 4/1965 | Cottle et al. | 260/79.5 |
| 3,341,491 | 9/1967 | Robinson | 260/45.75 |
| 3,427,319 | 2/1969 | Coran et al. | 260/309.2 |
| 3,473,667 | 10/1969 | Coran et al. | 260/309.7 |
| 3,513,139 | 5/1970 | Coran et al. | 260/79.5 |
| 3,546,185 | 12/1970 | Coran et al. | 260/79.5 |
| 3,562,225 | 2/1971 | Coran et al. | 260/79.5 |
| 3,586,696 | 6/1971 | Kerwood et al. | 260/326 |
| 3,640,976 | 2/1972 | Boustany | 260/79.5 B |
| 3,717,592 | 2/1973 | Rave | 260/2 A |

*Primary Examiner*—Melvin Goldstein
*Assistant Examiner*—E. A. Nielsen
*Attorney, Agent, or Firm*—F. W. Brunner; C. R. Schupaach; J. M. Wallace, Jr.

[57] ABSTRACT

A process for controlling premature curing of epihalohydrin polymers comprising heating an epihalohydrin homopolymer or a copolymer of epihalohydrin with a compound selected from the group consisting of imidazolidones, phthalimides and hydantoins.

6 Claims, No Drawings

EPIHALOHYDRIN CURE REGULATORS

This invention relates to a process for cure regulation of epihalohydrin polymers including homopolymers and copolymers.

The polymers based on epihalohydrins are saturated, high molecular weight, aliphatic polyethers having halomethyl sidechains. The halogen most commonly used is chlorine, although bromine is also known. The copolymer form generally utilizes ethylene oxide in the copolymerization. Epihalohydrins can be cured with materials that react difunctionally with the halomethyl sidechains. Representative examples of such curing materials are diamines, ureas, thioureas and ammonium salts.

A problem commonly encountered during the processing of epihalohydrin rubbers is scorch. Scorch is defined as the premature curing of the polymer. Scorch is undesirable because it prevents or interferes with further processing. It is therefore desirable that rubber additives be used which reduce scorching. Such compounds are commonly referred to as cure regulators or retarders.

The process of this invention comprises mixing a combination of the epihalohydrin polymer and a curing material described above with from about 0.5 part to about 7.0 parts by weight per 100 parts by weight based on the polymer, preferably from about 1.5 to about 4.5 parts by weight per 100 parts by weight based on the polymer, of an organic material selected from imidazolidones, phthalimides and hydantoins and curing the resulting composition by heating. The materials used as cure regulators are selected from the group consisting of (I) imidazolidones structural

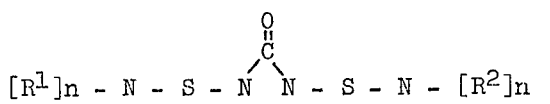

(II) phthalimides having general

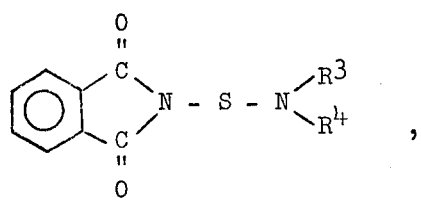

and (III) hydantoins.

In the above formula $R^3$ and $R^4$ are the same or different radicals selected from the group consisting of hydrogen, alkyl radicals having from 1 to 8 carbon atoms, cycloalkyl radicals having from 5 to 8 carbon atoms, piperidine and morpholine.

Representative examples of alkyl groups in the above formulas are ethyl, methyl, isopropyl and n-butyl. Examples of cycloalkyl radicals are cyclohexyl, cycloheptyl and cyclooctyl.

The cure regulators can be compounded or mixed with the polymer using internal mixers such as Banbury mixers or by mill mixing. Vulcanization is achieved by heating the resulting mixture at a temperature in the range of from about 120° C. to about 260° C. Generally a temperature in the range from about 130° C. to about 200° C. is used. Curing time will vary from about one minute to about 240 minutes. Usually the time required for curing is from about 10 minutes to about 60 minutes.

Representative examples of cure regulators of the present invention are given by group below.

GROUP I - IMIDAZOLIDONES 1,3 bis(diisopropylaminothio)-2-imidazolidone
1,3 bis(piperidinothio)-2-imidazolidone
1,3 bis(di-n-butylaminothio)-2-imidazolidone
1,3 bis(morpholinothio)-2-imidazolidone

GROUP II - PHTHALIMIDES

N-(dicyclohexylaminothio) phthalimide
N-(diisopropylaminothio) phthalimide
N-(piperidinothio) phthalimide
N-(morpholinothio) phthalimide

GROUP III - HYDANTOINS 1,3 bis(morpholinothio)-5,5-dimethyl hydantoin
1,3 bis(dibutyl)-5,5-dimethyl hydantoin In addition to the cure regulating agents, the polymer composition can contain other compounding materials such as additives and reinforcing materials which are normally used with vulcanized rubber products. Representative examples of such additives are metal oxides, reinforcing agents, pigments, fillers, softening agents, antioxidants, plasticizing agents, etc. The oxides of the Group II metals of the Periodic Table increase the degree of cure in a given vulcanization time, and the vulcanized products have a light color valuable in certain uses. Representative examples of such metal oxides are zinc oxide, and cadmium oxide.

The invention is described in the working examples given below in which parts and percentages are by weight unless otherwise indicated.

In experiments (1–13) mixing was effected with a two-paddle, water cooled, size B laboratory Banbury. All experimental compounds were mixed using the following procedure. The Banbury was charged with epichlorohydrin polymer, carbon black, stabilizers, process aids and plasticizers. The ram was lowered and the batch was mixed 3½ minutes at 50 revolutions per minute (rpm) rotor speed. At 3½ minutes the ram was raised and the Banbury throat was swept down. The ram was then lowered and the batch was mixed for an additional two minutes. The batch was discharged at a temperature between 125° C. and 145° C. The batch is sheeted out on a two roll mill to a gauge of 0.075 inch and allowed to rest for between 24 and 48 hours.

The curing agents and cure regulators were added on a two roll mill. The compound was sheeted to approximately 0.020 inch with the mill roll temperature at approximately 100° C. Ethylene thiourea and cure regulators were added. The batch was cross cut five times, rolled off the mill and passed endwise through the mill bite three times. The batch was then sheeted off the mill rolls at 0.050 gauge and allowed to rest for between 24 and 48 hours before curing at 160° C.

The curing characteristics were determined at 160° C. with an oscillating disc rheometer (manufactured by Monsanto). The rheometer recorded the torque exerted on the 3.8 cm. diameter rotor which oscillated 100 times per minute and oscillated with an angle of 5° over a predetermined duration of time.

Curing characteristics as measured with the oscillating disc rheometer described above were measured as to carbon black blends comprising epichlorohydrin-ethylene oxide copolymer (Hydrin 200 produced by Goodrich Chemicals Company). The formulation is shown in Table I below. The carbon black used was FEF type. Dioctyl phthalate, sorbitan monostearate, dibasic lead phthalate, dibasic lead phosphite and ethylene thiourea curative were used as the balance of the system. The compounds of this invention were added and compared to prior art compounds as described below. Compounds 1 through 8 are the compounds of this invention while compounds 9 through 13 are the prior art compounds.

In Tables I through IV below, the experimental compounds are identified using the following designations:

0 none
1 1,3-bis(morpholinothio)-2-imidazolidone
2 1,3-bis(diisopropylaminothio)-2-imidazolidone
3 1,3-bis(piperidinothio)-2-imidazolidone
4 1,3-bis(di-n-butylaminothio)-2-imidazolidone
5 N-(dicyclohexylaminothio)-phthalimide
6 N-(diisopropylaminothio)-phthalimide
7 N-(piperidinothio)-phthalimide
8 1,3-bis(morpholinothio)-5,5-dimethylhydantoin
9 salicyclic acid
10 benzoic acid
11 phthalic anhydride
12 N-nitroso diphenylamine
13 N-cyclohexylthio phthalimide Table I

| | Parts |
|---|---|
| Hydrin 200 | 100.0 |
| Carbon black (FEF) | 50.0 |
| Dioctyl phthalate | 5.0 |
| Sorbitan monostearate | 2.0 |
| Dibasic lead phthalate | 7.0 |
| Dibasic lead phosphite | 5.0 |
| Ethylene thiourea | 1.5 |
| Experimental retarder | $6.25 \times 10^{-3}$ moles |

The blended imidazolidones and their respective quantities are shown in Table II. The data in Table II shows that vulcanizing systems of this invention exhibit sufficiently long induction periods and achieve high degrees of vulcanization. Cure times for compositions containing the various materials were established by the crosslinked density ($T_{95}$) values in minutes as determined by the Monsanto Rheometer previously described.

Table II

| | 0 | 1 | 2 | 3 | 4 | 12 | 13 |
|---|---|---|---|---|---|---|---|
| Mooney Scorch at 270° F. (132° C.) | | | | | | | |
| Min | 44 | 39 | 37 | 38 | 34 | 43 | 44 |
| $T_5$ | 2.7 | 11.5 | 9.4 | 11.0 | 10.5 | 5.3 | 6.1 |
| Rheometer at 320° F. (160° C.) | | | | | | | |
| V Max. | 91 | 84 | 86 | 91 | 85 | 79 | 80 |
| V Min. | 19 | 15 | 14 | 15 | 14 | 16 | 16 |
| TΔ2 | 3.2 | 5.0 | 3.9 | 5.1 | 4.8 | 3.6 | 4.0 |
| $T_{95}\%$ | 50 | 45 | 42 | 47 | 40 | 55 | 55 |
| Stress-Strain Properties (Cure $T_{95}$ at 160° C.) | | | | | | | |
| Tensile(Mn/M²) | 11.1 | 13.2 | 12.6 | 15.2 | 11.3 | 12.5 | 13.2 |
| % Elongation | 230 | 360 | 320 | 310 | 290 | 335 | 320 |
| 100% Modulus | 5.9 | 4.5 | 4.8 | 5.6 | 4.4 | 4.4 | 4.5 |
| Shore A Hard. | 72 | 71 | 71 | 66 | 69 | 70 | 68 |

Table III below shows the effect of phthalimides much as Table II shows the result of imidazolidones.

Table III

| | 0 | 5 | 6 | 7 | 10 | 11 |
|---|---|---|---|---|---|---|
| Mooney Scorch at 270° F. | | | | | | |
| Min | 44 | 40 | 39 | 39 | 44 | 50 |
| $T_5$ | 2.7 | 5.9 | 5.5 | 6.6 | 3.7 | 3.5 |
| Rheometer at 320° F. | | | | | | |
| V Max. | 91 | 90 | 90 | 90 | 88 | 87 |
| V Min. | 19 | 16 | 15 | 15 | 16 | 19 |
| TΔ2 | 3.2 | 3.4 | 3.2 | 3.6 | 3.7 | 2.6 |
| $T_{95}\%$ | 50 | 48 | 48 | 45 | 50 | 50 |
| Stress-Strain (Cure $T_{95}$ at 160° C.) | | | | | | |
| Tensile(Mn/M²) | 11.1 | 12.7 | 12.5 | 13.6 | 11.5 | 12.0 |
| % Elongation | 230 | 275 | 270 | 300 | 250 | 265 |
| 100% Modulus | 5.9 | 5.5 | 5.3 | 5.3 | 5.5 | 5.3 |
| Shore A Hard. | 72 | 73 | 69 | 70 | 73 | 73 |

Table IV shows the effect of hydantoin as compared to the prior art compounds.

Table IV

| | 0 | 8 | 9 | 10 | 11 | 12 | 13 |
|---|---|---|---|---|---|---|---|
| Mooney Scorch at 270° F. | | | | | | | |
| Min | 44 | 39 | 50 | 44 | 50 | 43 | 44 |
| $T_5$ | 2.7 | 10.0 | 3.5 | 3.7 | 3.5 | 5.3 | 6.1 |

Table IV — Continued

|  | 0 | 8 | 9 | 10 | 11 | 12 | 13 |
|---|---|---|---|---|---|---|---|
| Rheometer at 320° F. | | | | | | | |
| V Max. | 91 | 80 | 92 | 88 | 87 | 79 | 80 |
| V Min. | 19 | 14 | 19 | 16 | 19 | 16 | 16 |
| TΔ2 | 3.2 | 4.1 | 3.0 | 3.7 | 2.6 | 3.6 | 4.0 |
| $T_{95}\%$ | 50 | 50 | 50 | 50 | 50 | 55 | 55 |
| Stress-Strain (Cure $T_{95}$ at 160° C.) | | | | | | | |
| Tensile($Mn/M^2$) | 11.1 | 13.6 | 11.8 | 11.5 | 12.0 | 12.5 | 13.2 |
| % Elongation | 230 | 370 | 230 | 250 | 265 | 335 | 320 |
| 100% Modulus | 5.9 | 4.5 | 6.0 | 5.5 | 5.3 | 4.4 | 4.5 |
| Shore A Hard. | 72 | 70 | 73 | 73 | 73 | 70 | 68 |

The above data demonstrate that the regulating agents of this invention are capable of providing a long induction period and achieving a high degree of vulcanization. This allows more effective use of this polymer in applications requiring long induction periods.

The imidazolidone materials all improve scorch behavior, shorten cure time and improve tensile strengths. Scorch control effectiveness at equal molar levels of substituted imidazolidones is: morpholino>piperidino>dibutyl>diisopropyl>control.

Phthalimides also increased initial tensile and elongation properties. However, relative to imidazolidones, scorch was impaired. Phthalimide scorch control is in the order: piperidino>dicyclohexyl>diisopropyl>control.

The hydantoins produce a high state of cure as well as impart excellent scorch protection.

The polymer compositions prepared by curing using the compounds of this invention can be used in products such as tires, molded goods and industrial rubber products such as transmission belts and hose, especially high temperature hose which must contain flexibility.

I claim:

1. A process for the curing of an epihalohydrin polymer selected from the group consisting of (A) epihalohydrin homopolymers and (B) epihalohydrin ethylene oxide comprising mixing a combination of the epihalohydrin homopolymer or copolymer and curing agents which reacts difunctionally with the halo methyl side chains while in the presence of from about 0.5 to about 7.0 parts by weight per 100 parts by weight based on the polymer of an organic material and heating the mixture at a temperature of from about 130° C. to about 200° C. for a time sufficient for curing to take place wherein the organic material is a phthalimide having the general structural formula

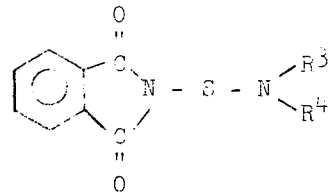

Table V

| | Cure Regulators in Hydrin 100 and Hydrin 200 | | | | | |
|---|---|---|---|---|---|---|
| | Rank as Scorch Inhibitor | | Scorch Time at 270° F. (Min.) | | Max. Rheometer Torque During Cure (in. —lb.) | |
| Material | 100 | 200 | 100 | 200 | 100 | 200 |
| 1,3-bis(morpholinothio)-2-imidazolidone | 1 | 1 | 11.0 | 11.5 | 79 | 84 |
| 1,3-bis(piperidinothio)-2-imidazolidone | 2 | 2 | 10.6 | 11.0 | 92 | 91 |
| 1,3-bis(dibutylaminothio)-2-imidazolidone | 3 | 3 | 9.7 | 10.5 | 88 | 85 |
| 1,3-bis(diisopropylaminothio)-2-imidazolidone | 4 | 5 | 8.8 | 9.4 | 87 | 86 |
| 1,3-bis(morpholinothio)-5,5-dimethylhydantoin | 5 | 4 | 8.7 | 10.0 | 80 | 80 |
| N-nitroso diphenylamine | 6 | 10 | 7.0 | 5.3 | 72 | 79 |
| N-cyclohexylthiophthalimide (PVI) | 7 | 7 | 6.2 | 6.1 | 75 | 80 |
| N-(dicyclohexylaminothio)-phthalimide | 8 | 8 | 6.0 | 5.9 | 91 | 90 |
| N-(piperidinothio)-phthalimide | 9 | 6 | 5.6 | 6.6 | 97 | 90 |
| N-(diisopropylaminothio)-phthalimide | 10 | 9 | 5.5 | 5.5 | 93 | 90 |
| phthalic anhydride | 11 | 13 | 4.4 | 3.5 | 83 | 87 |
| control - nothing added | 12 | 14 | 4.3 | 2.7 | 84 | 91 |
| salicyclic acid | 13 | 12 | 4.1 | 3.4 | 81 | 92 |
| benzoic acid | 14 | 11 | 3.8 | 3.7 | 79 | 88 |

As Table V shows, prior art regulators either reduce the state of cure (numbers 6 and 7) or have little effect on scorch (numbers 11, 13 and 14) and are therefore not desirable. In contrast, materials of this invention improve scorch delay with a minimal loss in state of cure. Examination of the data from numbers 2, 8, 9 and 10 indicates even a higher state of cure and excellent scorch delay in ethylene thiourea cured polymers containing no sulfur.

While certain representative embodiments and details have been shown for the purpose of illustrating the invention, it will be apparent to those skilled in this art that various changes and modifications may be made therein without departing from the spirit or the scope of the invention.

wherein $R^3$ and $R^4$ are the same or different radicals selected from the group consisting of hydrogen, alkyl radicals having from 1 to 8 carbon atoms, cycloalkyl radicals having from 5 to 8 carbon atoms, piperidinothio and morpholinothio.

2. A process as described in claim 1 wherein the phthalimides are selected from the group consisting of N-(dicyclohexylaminothio)-phthalimide; N-(diisopropylaminothio)-phthalimide; N-(piperidinothio)-phthalimide; and N-(morpholinothio)-phthalimide.

3. A process as described in claim 1 wherein the epihalohydrin polymer is an epichlorohydrin homopolymer.

4. A process as described in claim 1 wherein the epihalohydrin polymer is a copolymer of epichlorohydrin and ethylene oxide.

5. A process as described in claim 1 wherein the organic material is present from 1.5 to 4.5 parts by weight per 100 parts by weight of the polymer.

6. A process as described in claim 1 wherein the cure regulators are used with metal oxides selected from the group consisting of zinc oxide and cadmium oxide.

* * * * *